(12) United States Patent
Robinson

(10) Patent No.: US 8,739,257 B1
(45) Date of Patent: May 27, 2014

(54) MANAGING AUTHENTICATION OF VIRTUAL CLIENTS

(75) Inventor: Peter Robinson, Enoggera Reservoir (AU)

(73) Assignee: EMC Corporation, Hopkinton, MA (US)

( * ) Notice: Subject to any disclaimer, the term of this patent is extended or adjusted under 35 U.S.C. 154(b) by 0 days.

(21) Appl. No.: 13/432,457

(22) Filed: Mar. 28, 2012

(51) Int. Cl.
*H04L 29/06* (2006.01)
*G06F 21/00* (2013.01)

(52) U.S. Cl.
USPC .................................. 726/6; 726/27; 713/168

(58) Field of Classification Search
None
See application file for complete search history.

(56) References Cited

U.S. PATENT DOCUMENTS

2007/0171921 A1\* 7/2007 Wookey et al. ............... 370/401
2012/0054486 A1\* 3/2012 Lakkavalli et al. ........... 713/156

\* cited by examiner

*Primary Examiner* — Izunna Okeke
(74) *Attorney, Agent, or Firm* — Krishnendu Gupta; Deepika Bhayana

(57) ABSTRACT

A method is used in managing authentication of virtual clients. An identifier for a virtual client is generated by a virtual server. The identifier is added to a configuration file by the virtual server. The configuration file is associated with the virtual client. The virtual client is authenticated based on the identifier.

16 Claims, 11 Drawing Sheets

MANAGING AUTHENTICATION OF VIRTUAL CLIENTS

BACKGROUND

1. Technical Field

This application relates to managing authentication of virtual clients.

2. Description of Related Art

Computer systems may include different resources used by one or more host processors. Resources and processors in a computer system may be interconnected by one or more communication connections. These resources may include, for example, data storage systems, such as the Symmetrix™ or CLARiiON™ (also referred to herein as Clariion) family of data storage systems manufactured by EMC Corporation. These data storage systems may be coupled to one or more host processors and provide storage services to each host processor. An example data storage system may include one or more data storage devices, such as those of the Symmetrix™ family, that are connected together and may be used to provide common data storage for one or more host processors in a computer system.

In a common implementation, a Storage Area Network (SAN) is used to connect computing devices with a large number of storage devices. Management and modeling programs may be used to manage these complex computing environments.

Virtualization is becoming more prevalent in the information technology industry, transforming computational functionality into information that can be stored and managed.

Platforms that support virtualization normally use virtual machine systems (Virtual Machine Monitor or VMM) to orchestrate and provision virtual machines (VMs) on the fly. The VMM software system typically co-exists with the operating system (OS) to provide the functionality of resident software on the platform controlling access to all the resources that belong to that platform. On top of this resident software layer, sits the VMs running their individual applications within their own operating system shell. They either time-share the underlying physical resources or simultaneously execute with dedicated physical resources. This mapping from virtual machines to physical machines is achieved by the VMM either independently or in conjunction with the OS.

In essence, virtualization of computer resources involves abstracting computer hardware, which isolates operating systems and applications from underlying hardware. Hardware is therefore shared among multiple operating systems and applications wherein each operating system and its corresponding applications are isolated in corresponding VM and wherein each VM is a complete execution environment. As a result, hardware can be more efficiently utilized.

A VM executing on a virtualized computer system will typically be limited to hardware resources (such as memory space, CPU cycles, network bandwidth, and so on) provided by that virtualized computer system, i.e., VMs executing on a first virtualized computer system typically share the hardware resources of the first virtualized computer system, and VMs executing on a second virtualized computer system typically share the hardware resources of the second virtualized computer system. As such, the performance of a VM will depend on the hardware resources of the virtualized computer system on which the VM is executing, as well as demands of any other VMs executing on the same virtualized computer system.

Further, uses for the Internet and the World Wide Web are continually increasing, and have expanded into "secure" areas. Different mechanisms for maintaining security in a network such as the Internet have been developed, such as the Secure Sockets Layer (SSL) security protocol. The SSL protocol uses a public key infrastructure to maintain security. In establishing an SSL connection between a client computer and a server computer hosting a web page, the server computer transmits a certificate to the client computer for verification or validation.

Typically in practice, when a user's Web browser first tries to contact a server for a secure transaction, the server sends its digital certificate to the browser. This certificate includes (among other things) the server's public key, the server's identity, the name of the certificate authority (CA) that signed the certificate and the signature itself (which is a mathematical hash of the certificate encrypted with the CA's private key). To validate the certificate, the browser computes the certificate hash and compares the result with the hash obtained by decrypting the signature using the CA's public key (as well as checking the validity dates and identity included in the certificate against the desired server). To then validate the server, the browser encrypts a message with the public key obtained from the certificate and sends it to the server. If the server can prove it can decrypt that message then it must have the associated private key and the authentication has succeeded. If desired, the server may likewise validate the browser. Once the browser and (optionally) the server is/are satisfied that each is the computer it claims to be, the browser and server can exchange session keys (additional keys that are used to encrypt the data transfers between the computers from then on).

Further, as the size and diversity of the Internet grows, so do the applications that use the network. Originally, network applications such as web browsers, terminal clients, and e-mail readers were the only programs accessing the Internet. Now, almost every application has a networking component, whether it is to obtain updates, manage licensing, or report usage statistics.

Although pervasive network connectivity provides a number of benefits, it also introduces security risks. Many programs that access the network allow users to leak confidential information or expose them to new attack vectors. An example is instant messaging (IM) software. Most IM programs permit direct file transfers. Also, so-called IM viruses are able to circumvent security systems by going through the IM network itself. Peer-to-peer file sharing software presents a risk as well because files often come packaged with Trojan horse malware. These unwanted applications are not outright malicious and therefore not detected by conventional security software, but they can still pose a serious threat to system security.

In addition to unwanted applications, many programs that directly harm their host computers communicate over the network. The resulting malware traffic may contain sensitive information, such as log-in names, passwords, and credit card numbers, which were collected from the host. This traffic may also have command and control information, such as instructions to download other malicious programs or attack other computers.

As the Internet grows and network bandwidth continues to increase, administrators are faced with the task of keeping confidential information from leaving their networks. Today's link speeds and traffic volume are such that manual inspection of all network traffic would be unreasonably expensive. Some security solutions, such as intrusion prevention systems and anti-virus software, focus on protecting the integrity of computers that house sensitive information. Unfortunately, these approaches do not stop insider leaks, which are a serious security threat. In response to the threat of insider leaks, some vendors have provided data loss prevention (DLP) systems that inspect outgoing traffic for known confidential information.

In the computer field it is known to employ authentication techniques to establish trust or confidence as a condition to allowing access to protected operations. One simple but well known authentication technique uses passwords that are handled confidentially and supposedly known to only a user and a computer system to which the user is to be authenticated. During authentication, the user presents the password, and the computer system checks the presented password against a password that is stored in association with an identifier of the user. If the values match, authentication has occurred and access to protected operation(s) is granted. Many other forms of authentication are known, usable in a variety of types of systems and operating circumstances.

One particular type of computer system employs so-called "virtualization" techniques in which physical host computer hardware executes instances of "virtual machines". A virtual machine is a software construct that presents a machine-like interface to a guest operating system and application program(s) executing in the context of the virtual machine, isolated from similar programs executing in the context of other virtual machines executing on the host computer hardware. One aspect of virtualization technology is the ability to very quickly and flexibly deploy new virtual machines as needed to accommodate changes in a system's workload. As an example, virtual machines can be used to deploy client type machines usable by a set of users in an organization. A new client machine is brought into service by instantiating a new client virtual machine on the existing host computer hardware. The new client virtual machine may be created as a clone of a standardized "template" client virtual machine defined in the system.

SUMMARY OF THE INVENTION

A method is used in managing authentication of virtual clients. An identifier for a virtual client is generated by a virtual server. The identifier is added to a configuration file by the virtual server. The configuration file is associated with the virtual client. The virtual client is authenticated based on the identifier.

BRIEF DESCRIPTION OF THE DRAWINGS

Features and advantages of the present invention will become more apparent from the following detailed description of exemplary embodiments thereof taken in conjunction with the accompanying drawings in which.

DETAILED DESCRIPTION OF EMBODIMENT(S)

Figure 1:
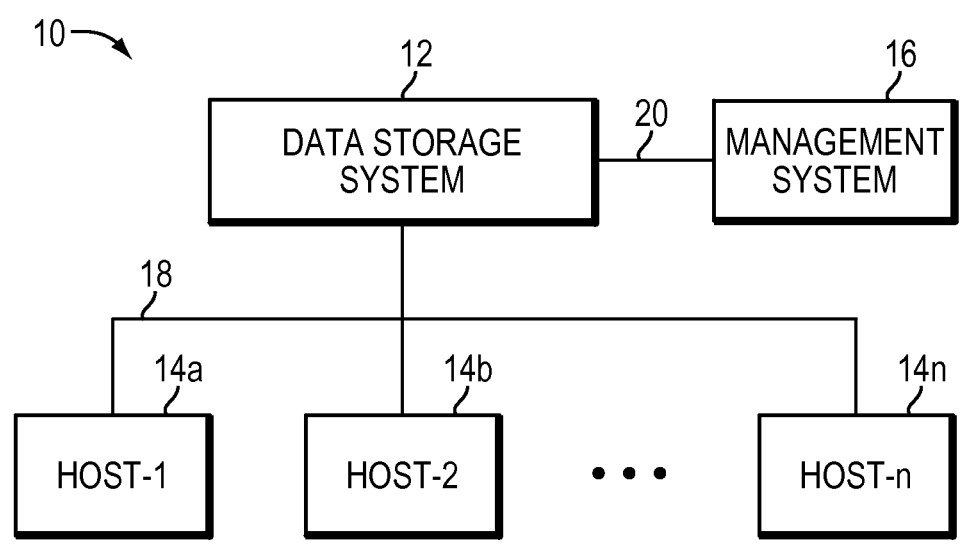
FIG. 1 is an example of an embodiment of a computer system that may utilize the techniques described herein.

Described below is a technique for use in managing authentication of virtual clients, which technique may be used to provide, among other things, generating an identifier for a virtual client by a virtual server, where the identifier is added to a configuration file by the virtual server, where the configuration file is associated with the virtual client, and based on the identifier, authenticating the virtual client.

A virtualization management system such as VMware® vSphere™ is a virtualization platform that delivers infrastructure and application services, and consolidates a set of virtual machines on a single physical server without impacting or with minimal impact to performance or throughput of the physical server. Further, a virtualization management system includes one or more VMware® ESX Server™, VMware® vCenter™ Server (formerly known as VMware® Virtual Center), and vSphere™ client interfaces. Generally, a virtual system such as vCenter™ Server (also referred to herein as "virtual server") communicates with a data storage system for retrieving and reporting storage provisioned for the virtual system by the data storage system. Typically, a file system protocol such as VMware® vStorage Virtual Machine File System ("VMFS") allows virtual machines to access shared storage devices (e.g., Fibre Chanel, iSCSI) of a data storage system.

Conventionally, key management clients typically identify themselves to a key management server by means of identity certificates. These certificates may be specific to a key client, associated with it arbitrarily (such as in Active Directory or a file directory) or may be associated with it as a result of negotiating trust in an SSL/TLS session. This conventional approach is inadequate to the flexibility of the virtual environment, in which the movement of the client image across the virtual infrastructure can dramatically change the security properties associated with the key client. Further, conventionally, in a virtual environment, a virtual management server (e.g., VMware® ESX Server™) that provides services to a set of virtual clients must determine whether the virtual clients accessing the services of the virtual management server are part of the virtual environment. Further, in such a conventional system, a virtual management server authenticates a set of virtual clients by storing credential information used for authentication inside each virtual client. Further, in such a conventional system, a virtual management server may need to include an additional functionality in order to authenticate credential information of a set of virtual clients.

By contrast, in at least some implementations in accordance with the current technique as described herein, managing authentication of virtual clients includes monitoring a set of virtual clients by a virtual server system (also referred to as "virtual server machine" or "virtual server") that generates credential information such as an identifier for a virtual client (also referred to herein as "client virtual machine") such that the identifier is stored in a configuration file of the virtual client which may be stored on a virtual management server that provides services to the virtual client. Further, the configuration file of a virtual client is updated by a virtual server when the virtual client is configured in a virtual environment managed by a virtual management server. In at least one embodiment of the current technique, a virtual client requests contents of a configuration file associated with the virtual client from a virtual management server that manages a set of virtual clients. Further, the virtual client retrieves an identifier associated with the virtual client from the configuration file and sends the identifier to a virtual server system such that the virtual server system may authenticate the virtual client when the virtual client establishes a connection with the virtual server. Consequently, the virtual server system authenticates the virtual client by determining the IP address of the connection established by the virtual client, requesting credential information of the virtual client from the virtual management server based on the IP address of the virtual client, and comparing the credential information received from the virtual management server with the identifier received from the virtual client. As a result, the virtual server authenticates the virtual client by verifying that the virtual client is part of a virtual environment managed by the virtual management server. Thus, in at least one embodiment of the current technique, credential information that is used for authenticating a virtual client does not need to be stored inside the virtual client.

Therefore, in at least some implementations in accordance with the current technique as described herein, the use of the managing authentication of virtual clients can provide one or more of the following advantages: simplifying the design of a virtual management server by using a virtual server for managing authentication of a set of virtual clients, and efficiently managing authentication of a virtual client by creating a framework to authenticate a set of virtual clients by a virtual server.

Referring now to FIG. 1, shown is an example of an embodiment of a computer system that may be used in connection with performing the authentication of virtual clients technique described herein. The computer system 10 includes one or more data storage systems 12 connected to servers (also referred to as hosts or host systems) 14a-14n through communication medium 18. At least one of the host systems 14a-14n includes or provides one or more virtual machines as described below. The system 10 also includes a management system 16 connected to one or more data storage systems 12 through communication medium 20. In this embodiment of the computer system 10, the management system 16, and the N servers or hosts 14a-14n may access the data storage systems 12, for example, in performing input/output (I/O) operations, data requests, and other operations. The communication medium 18 may be any one or more of a variety of networks or other type of communication connections as known to those skilled in the art. Each of the communication mediums 18 and 20 may be a network connection, bus, and/or other type of data link, such as a hardwire or other connections known in the art. For example, the communication medium 18 may be the Internet, an intranet, network or other wireless or other hardwired connection(s) by which the host systems 14a-14n may access and communicate with the data storage systems 12, and may also communicate with other components (not shown) that may be included in the computer system 10. In at least one embodiment, the communication medium 20 may be a LAN connection and the communication medium 18 may be an iSCSI or Fibre Channel connection.

Each of the host systems 14a-14n and the data storage systems 12 included in the computer system 10 may be connected to the communication medium 18 by any one of a variety of connections as may be provided and supported in accordance with the type of communication medium 18. Similarly, the management system 16 may be connected to the communication medium 20 by any one of a variety of connections in accordance with the type of communication medium 20. The processors included in the host computer systems 14a-14n and management system 16 may be any one of a variety of proprietary or commercially available single or multi-processor system, such as an Intel-based processor, or other type of commercially available processor able to support traffic in accordance with each particular embodiment and application.

It should be noted that the particular examples of the hardware and software that may be included in the data storage systems 12 and in at least one of the host computers 14a-14n are described herein in more detail, and may vary with each particular embodiment. Each of the host computers 14a-14n, the management system 16 and data storage systems may all be located at the same physical site, or, alternatively, may also be located in different physical locations. In connection with communication mediums 18 and 20, a variety of different communication protocols may be used such as SCSI, Fibre Channel, iSCSI, and the like. Some or all of the connections by which the hosts, management system, and data storage system may be connected to their respective communication medium may pass through other communication devices, such as a Connectrix or other switching equipment that may exist such as a phone line, a repeater, a multiplexer or even a satellite. In at least one embodiment, the hosts may communicate with the data storage systems over an iSCSI or fibre channel connection and the management system may communicate with the data storage systems over a separate network connection using TCP/IP. It should be noted that although FIG. 1 illustrates communications between the hosts and data storage systems being over a first connection, and communications between the management system and the data storage systems being over a second different connection, an embodiment may also use the same connection. The particular type and number of connections may vary in accordance with particulars of each embodiment.

Each of the host computer systems may perform different types of data operations in accordance with different types of tasks. In the embodiment of FIG. 1, any one of the host computers 14a-14n may issue a data request to the data storage systems 12 to perform a data operation.

The management system 16 may be used in connection with management of the data storage systems 12. The management system 16 may include hardware and/or software components. The management system 16 may include one or more computer processors connected to one or more I/O devices such as, for example, a display or other output device, and an input device such as, for example, a keyboard, mouse, and the like. A data storage system manager may, for example, view information about a current storage volume configuration on a display device of the management system 16. The manager may also configure a data storage system, for example, by using management software to define a logical grouping of logically defined devices, referred to elsewhere herein as a storage group (SG), and restrict access to the logical group.

An embodiment of the data storage systems 12 may include one or more data storage systems. Each of the data storage systems may include one or more data storage devices, such as disks. One or more data storage systems may be manufactured by one or more different vendors. Each of the data storage systems included in 12 may be inter-connected (not shown). Additionally, the data storage systems may also be connected to the host systems through any one or more communication connections that may vary with each particular embodiment and device in accordance with the different protocols used in a particular embodiment. The type of communication connection used may vary with certain system parameters and requirements, such as those related to bandwidth and throughput required in accordance with a rate of I/O requests as may be issued by the host computer systems, for example, to the data storage systems 12.

It should be noted that each of the data storage systems may operate stand-alone, or may also included as part of a storage area network (SAN) that includes, for example, other components such as other data storage systems.

Each of the data storage systems of element 12 may include a plurality of disk devices or volumes. The particular data storage systems and examples as described herein for purposes of illustration should not be construed as a limitation. Other types of commercially available data storage systems, as well as processors and hardware controlling access to these particular devices, may also be included in an embodiment.

Servers or host systems, such as 14a-14n, provide data and access control information through channels to the storage systems, and the storage systems may also provide data to the host systems also through the channels. The host systems do not address the disk drives of the storage systems directly, but rather access to data may be provided to one or more host systems from what the host systems view as a plurality of logical devices or logical volumes. The logical volumes may or may not correspond to the actual disk drives. For example, one or more logical volumes may reside on a single physical disk drive. Data in a single storage system may be accessed by multiple hosts allowing the hosts to share the data residing therein. A LUN (logical unit number) may be used to refer to one of the foregoing logically defined devices or volumes.

Figure 2:
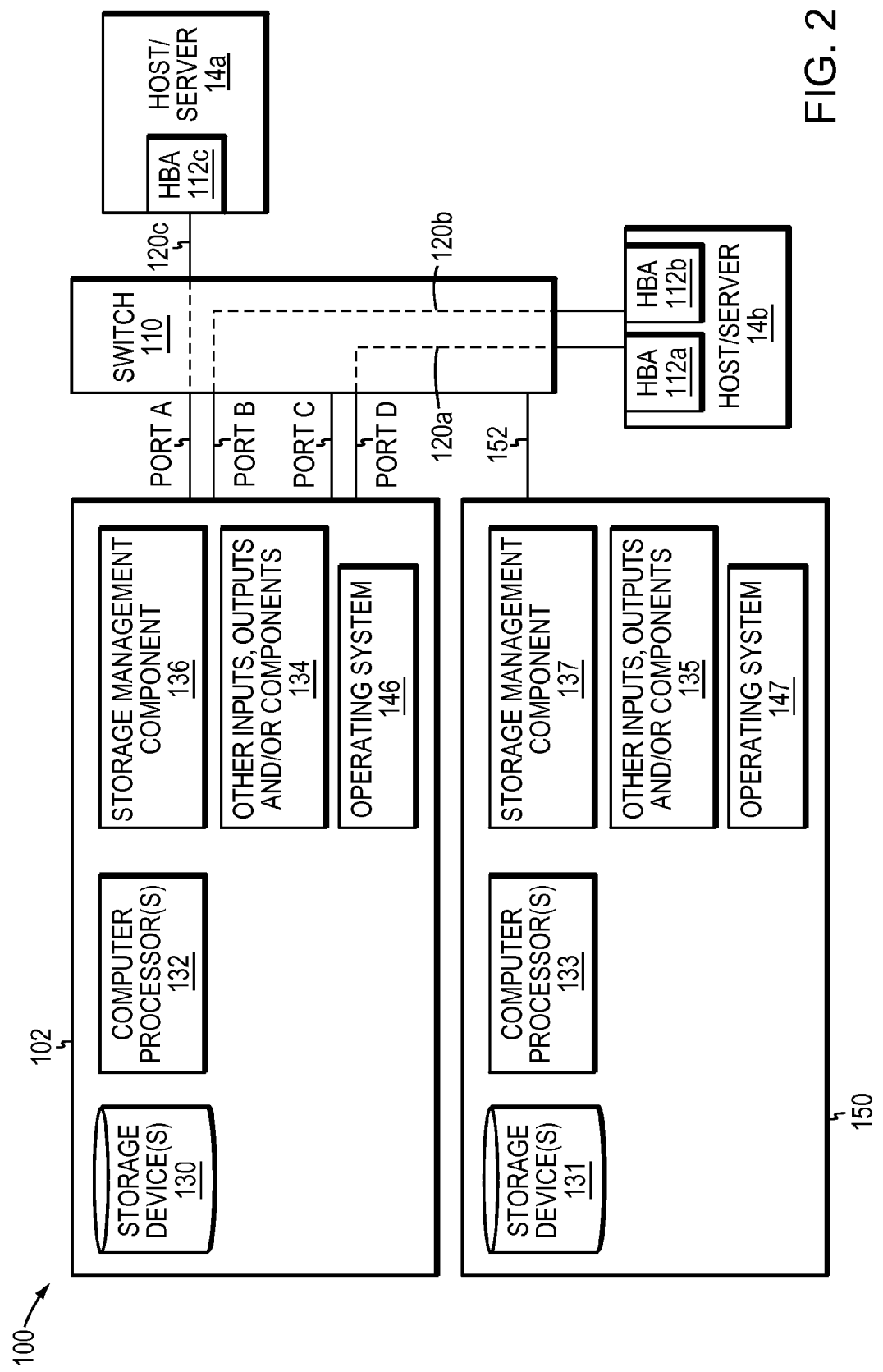
FIGS. 2-9 are block diagrams illustrating in more detail components that may be used in connection with techniques described herein.

Referring now to FIG. 2, shown is an example 100 of components that may be used in connection with the current technique described herein. The example 100 may represent components illustrated in connection of FIG. 1 configured in a storage area network (SAN). Included in the example 100 are data storage systems 102 and 150, a switch 110, and hosts or servers 14a and 14b. The switch 110 may be used in connection with facilitating communications between each of the hosts 14a and 14b and the data storage systems 102 and 150. Communications between a host and the data storage system 102 may be defined in terms of a path. Host 14a communicates with the data storage system 102 over a path designated as 120c. Path 120c is formed by the starting point, the HBA or host bus adapter 112c and the ending point, port A of the receiving data storage system 102. Host 14b communicates with the data storage system 102 over two paths designated as 120a and 120b. Path 120a is formed by the starting point, the HBA 112a, and the ending point, port d of the receiving data storage system 102. Path 120b is formed by the starting point, the HBA 112b, and the ending point, port b of the receiving data storage system 102. It should be noted that different HBAs from the same or different hosts may also communicate with the data storage system through a same port of the data storage system although each path 112a, 112b, and 112c use a different port. An embodiment may represent a path using the WWN (world wide name) of a host's HBA and the WWN of a data storage system port receiving the request. As known to those skilled in the art, a WWN is a unique number assigned by a recognized naming authority that identifies a connection or a set of connections to the network. As also known to those skilled in the art, various networking technologies that may be used in an embodiment make use of WWNs.

Each HBA may include one or more ports although in the example illustrated, each HBA has only a single port. As represented with element 152, connections between the hosts using switch 110 may be made with respect to data storage system 150. Although only two data storage system are illustrated for purposes of simplicity in illustration, each of the hosts may have connections to other data storage systems in the SAN. Additionally, each host may be connected to the data storage systems 102, 150 using other connections, including direct cabling, than as illustrated in FIG. 2.

The data storage systems 102, 150 are illustrated as each including one or more storage devices 130, 131, one or more computer processors 132, 133, an operating system 146, 147, a storage management component 136, 137, and other inputs, outputs and/or components 134, 135, which may include all or some of other logic described below.

The one or more storage devices 130 may represent one or more physical devices, such as disk drives, that may be accessed in logical units (e.g., as LUNs) as described elsewhere herein. The operating system 146 may be any one of a variety of commercially available, proprietary, or other operating system capable of execution by the one or more computer processors 132 in accordance with the particulars of the data storage system 102.

As used herein, the term network storage refers generally to storage systems and storage array technology, including storage area network (SAN) implementations, network attached storage (NAS) implementations, and other storage architectures that provide a level of virtualization for underlying physical units of storage. In general, such storage architectures provide a useful mechanism for sharing storage resources amongst computational systems. In some cases, computational systems that share storage resources may be organized as a coordinated system (e.g., as a cluster or cooperatively managed pool of computational resources or virtualization systems). For example, in a failover cluster it may be desirable to share (or at least failover) virtual machine access to some storage units. Similarly, in a managed collection of virtualization systems, it may be desirable to migrate or otherwise transition virtual machine computations from one virtualization system to another. In some cases, at least some computational systems may operate independently of each other, e.g., employing independent and exclusive units of storage allocated from a storage pool (or pools) provided and/or managed using shared network storage.

Generally, either or both of the underlying computer systems and storage systems may be organizationally and/or geographically distributed. For example, some shared storage (particularly storage for data replication, fault tolerance, backup and disaster recovery) may reside remotely from a computational system that uses it. Of course, as will be appreciated by persons of ordinary skill in the art, remoteness of shared storage is a matter of degree. For example, depending on the configuration, network storage may reside across the globe, across the building, across the data center or across the rack or enclosure.

While embodiments of the current technique, particularly cluster-organized and/or enterprise scale systems, may build upon or exploit data distribution, replication and management features of modern network storage technology, further embodiments may be used in more modest computational systems that employ network storage technology. For example, even a single computer system may employ SAN-type storage facilities in its storage architecture. Thus, while some embodiments utilize network storage that can be shared and while at least some underlying elements thereof may be remote, persons of ordinary skill in the art will understand that for at least some embodiments, network storage need not be shared or remote.

For concreteness, embodiments are described which are based on facilities, terminology and operations typical of certain processor architectures and systems, and based on terminology typical of certain operating systems, virtualization systems, storage systems and network protocols and/or services. That said, the embodiments are general to a wide variety of processor and system architectures (including both single and multi-processor architectures based on any of a variety of instruction set architectures), to numerous operating system implementations and to systems in which both conventional and virtualized hardware may be provided. As described herein, the embodiments are also general to a variety of storage architectures, including storage virtualization systems such as those based on storage area network (SAN) or network attached storage (NAS) technologies.

Accordingly, in view of the foregoing and without limitation on the range of underlying processor, hardware or system architectures, operating systems, storage architectures or virtualization techniques that may be used in embodiments of the current technique are described. Based on these descriptions, and on the claims that follow, persons of ordinary skill in the art will appreciate a broad range of suitable embodiments.

Figure 3:
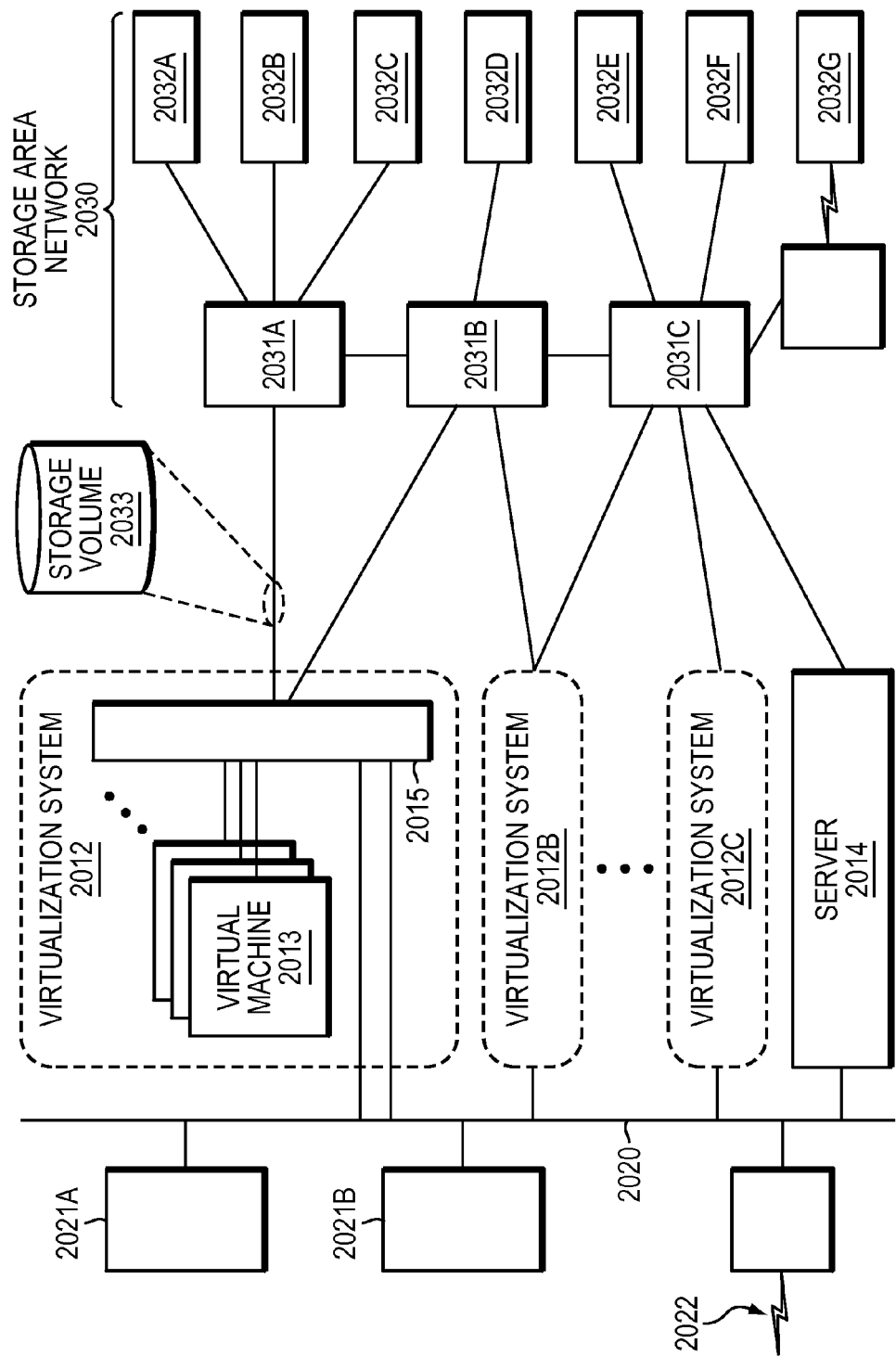

With respect to computational systems, generally, FIG. 3 depicts a collection or cluster of computational systems in which an embodiment of the current technique may be provided. In particular, FIG. 3 illustrates a collection or cluster in which at least a collection of virtualization systems 2012, 2012B, 2012C (but more generally, a mix of virtualization systems and conventional hardware systems such as server 2014) are configured to share storage resources. In the illustrated collection or cluster, constituent computational systems (e.g., virtualization systems 2012, 2012B, 2012C and server 2014) are coupled to network 2020 which is illustrated (for simplicity) as a local area network with client systems 2021A, 2021B and communications interface 2022, but will be more generally understood to represent any of a variety of networked information systems including configurations coupled to wide area networks and/or the Internet using any of a variety of communications media and protocols. One or more of systems 2012, 2012B, 2012C, 2014 may be, include, or be included in hosts 14a, 14b.

In the illustrated collection, storage area network (SAN) technology is used for at least some storage needs of computational systems participating in the collection. (The current technique can also be used for NAS storage allocated to a virtual machine environment.) In general, network storage systems (including SAN-based system 2030) provide a level of virtualization for underlying physical storage elements (e.g., individual disks, tapes and/or other media), where the characteristics and/or configuration of particular storage elements may be hidden from the systems that employ the storage. SAN-based systems typically provide an abstraction of storage pools from which individual storage units or volumes may be allocated or provisioned for block level I/O access. In the illustrated collection, a switched fabric topology consistent with Fibre Channel SAN technology is shown in which switches 2031A, 2031B, 2031C and/or directors are used to mediate high bandwidth access (typically using a SCSI, Small Computer System Interface, command set) to an extensible and potentially heterogeneous set of storage resources 2032A, 2032B, 2032C, 2032D, 2032E, 2032F, 2032G, e.g., SATA (Serial ATA) and/or SCSI disks, tape drives, as well as arrays thereof (e.g., RAID, i.e., Redundant Array of Inexpensive Disks). Such resources may be distributed and (if desirable) may provide data replication and/or off-site storage elements. Fibre Channel is a gigabit-speed network technology standardized in the T11 Technical Committee of the Inter National Committee for Information Technology Standards (INCITS). One or more of switches 2031A, 2031B, 2031C may be, include, or be included in switch 110. One or more of storage resources 2032A, 2032B, 2032C, 2032D, 2032E, 2032F, 2032G, may be, include, or be included in one or more of data storage systems 102, 150.

In general, a variety of different types of interconnect entities, including, without limitation, directors, switches, hubs, routers, gateways, and bridges may be used in topologies (or sub-topologies) that include point-to-point, arbitrated loop, switched fabric portions. Fibre Channel and non-Fibre Channel technologies including those based on iSCSI protocols (i.e., SCSI command set over TCP/IP) or ATA-over-Ethernet (AoE) protocols may be used in embodiments of the managing authentication of virtual clients technique. Similarly, any of a variety of media including copper pair, optical fiber, etc. may be used in a network storage system such as SAN 2030.

Embodiments of the current technique may be understood in the context of virtual machines 2013 (or virtual computers) that are presented or emulated within a virtualization system such as virtualization system 2012 executing on underlying hardware facilities 2015. However, in addition, migration from (or to) a computational system embodied as a conventional hardware-oriented system may be supported in some systems configured in accordance with the current technique. Nonetheless, for simplicity of description and ease of understanding, embodiments are described in which individual computational systems are embodied as virtualization systems that support one or more virtual machines.

Although certain virtualization strategies/designs are described herein, virtualization system 2012 is representative of a wide variety of designs and implementations in which underlying hardware resources are presented to software (typically to operating system software and/or applications) as virtualized instances of computational systems that may or may not precisely correspond to the underlying physical hardware.

With respect to virtualization systems, the term virtualization system as used herein refers to any one of an individual computer system with virtual machine management functionality, a virtual machine host, an aggregation of an individual computer system with virtual machine management functionality and one or more virtual machine hosts communicatively coupled with the individual computer system, etc. Examples of virtualization systems include commercial implementations, such as, for example and without limitation, VMware® ESX Server™ (VMware and ESX Server are trademarks of VMware, Inc.), VMware® Server, and VMware® Workstation, available from VMware, Inc., Palo Alto, Calif.; operating systems with virtualization support, such as Microsoft® Virtual Server 2005; and open-source implementations such as, for example and without limitation, available from XenSource, Inc.

As is well known in the field of computer science, a virtual machine is a software abstraction—a "virtualization"—of an actual physical computer system. Some interface is generally provided between the guest software within a VM and the various hardware components and devices in the underlying hardware platform. This interface-which can generally be termed "virtualization layer"—may include one or more software components and/or layers, possibly including one or more of the software components known in the field of virtual machine technology as "virtual machine monitors" (VMMs), "hypervisors," or virtualization "kernels."

Because virtualization terminology has evolved over time, these terms (when used in the art) do not always provide clear distinctions between the software layers and components to which they refer. For example, the term "hypervisor" is often used to describe both a VMM and a kernel together, either as separate but cooperating components or with one or more VMMs incorporated wholly or partially into the kernel itself. However, the term "hypervisor" is sometimes used instead to mean some variant of a VMM alone, which interfaces with some other software layer(s) or component(s) to support the virtualization. Moreover, in some systems, some virtualization code is included in at least one "superior" VM to facilitate the operations of other VMs. Furthermore, specific software support for VMs is sometimes included in the host OS itself.

Embodiments are described and illustrated herein primarily as including one or more virtual machine monitors that appear as separate entities from other components of the virtualization software. This paradigm for illustrating virtual machine monitors is only for the sake of simplicity and clarity and by way of illustration. Differing functional boundaries may be appropriate for differing implementations. In general, functionality and software components/structures described herein can be implemented in any of a variety of appropriate places within the overall structure of the virtualization software (or overall software environment that includes the virtualization software).

With respect to the virtual machine monitor, in view of the above, and without limitation, an interface usually exists between a VM and an underlying platform which is responsible for executing VM-issued instructions and transferring data to and from memory and storage devices or underlying hardware. A VMM is usually a thin piece of software that runs directly on top of a host, or directly on the hardware, and virtualizes at least some of the resources of the physical host machine. The interface exported to the VM is then the same as the hardware interface of a physical machine. In some cases, the interface largely corresponds to the architecture, resources and device complements of the underlying physical hardware; however, in other cases it need not.

Although the VM (and thus applications executing in the VM and their users) cannot usually detect the presence of the VMM, the VMM and the VM may be viewed as together forming a single virtual computer. They are shown and described herein as separate components for the sake of clarity and to emphasize the virtual machine abstraction achieved. However, the boundary between VM and VMM is somewhat arbitrary. For example, while various virtualized hardware components such as virtual CPU(s), virtual memory, virtual disks, and virtual device(s) including virtual timers are presented as part of a VM for the sake of conceptual simplicity, in some virtualization system implementations, these "components" are at least partially implemented as constructs or emulations exposed to the VM by the VMM. One advantage of such an arrangement is that the VMM may be set up to expose "generic" devices, which facilitate VM migration and hardware platform-independence. In general, such functionality may be said to exist in the VM or the VMM.

Figure 4:
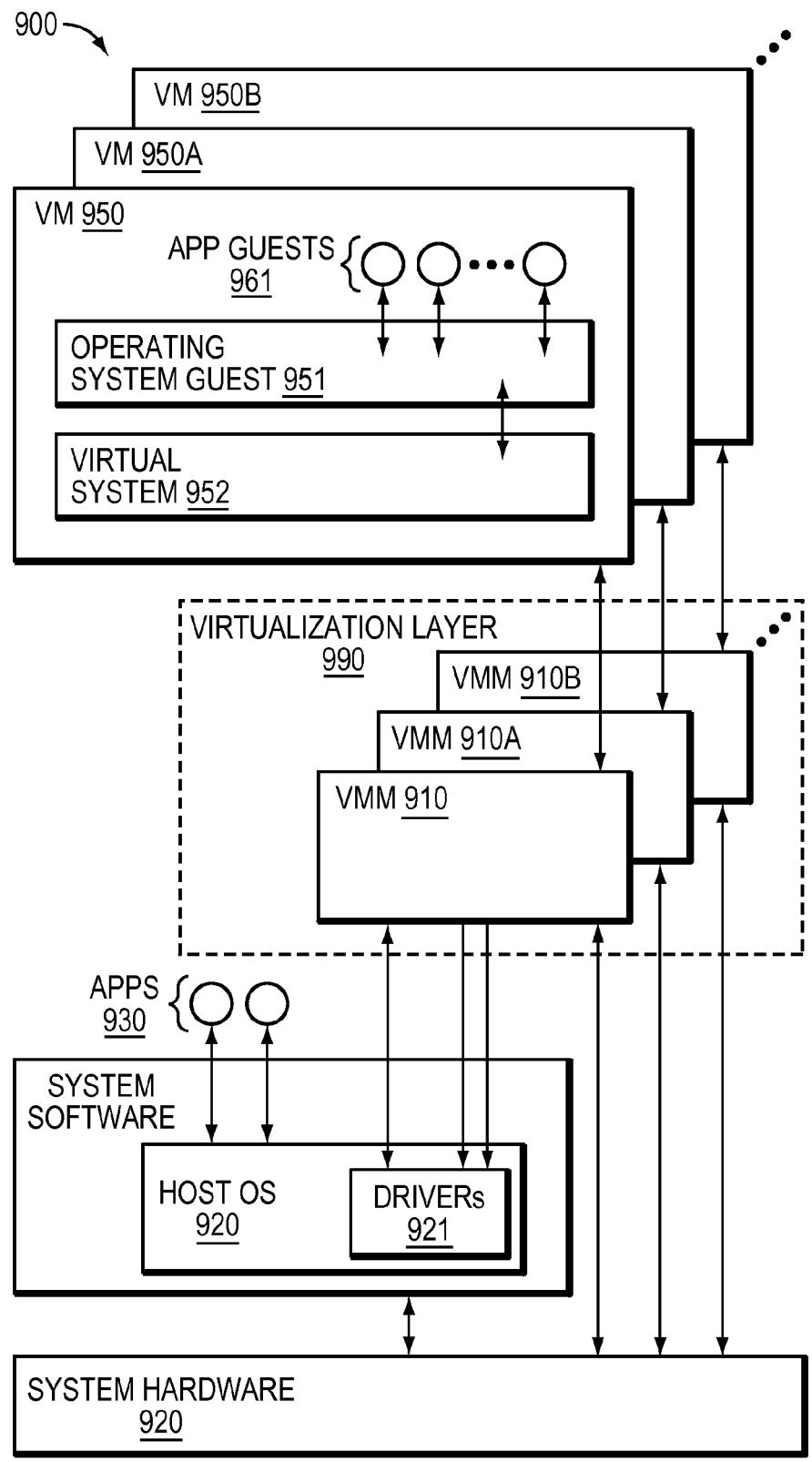
Figure 5:
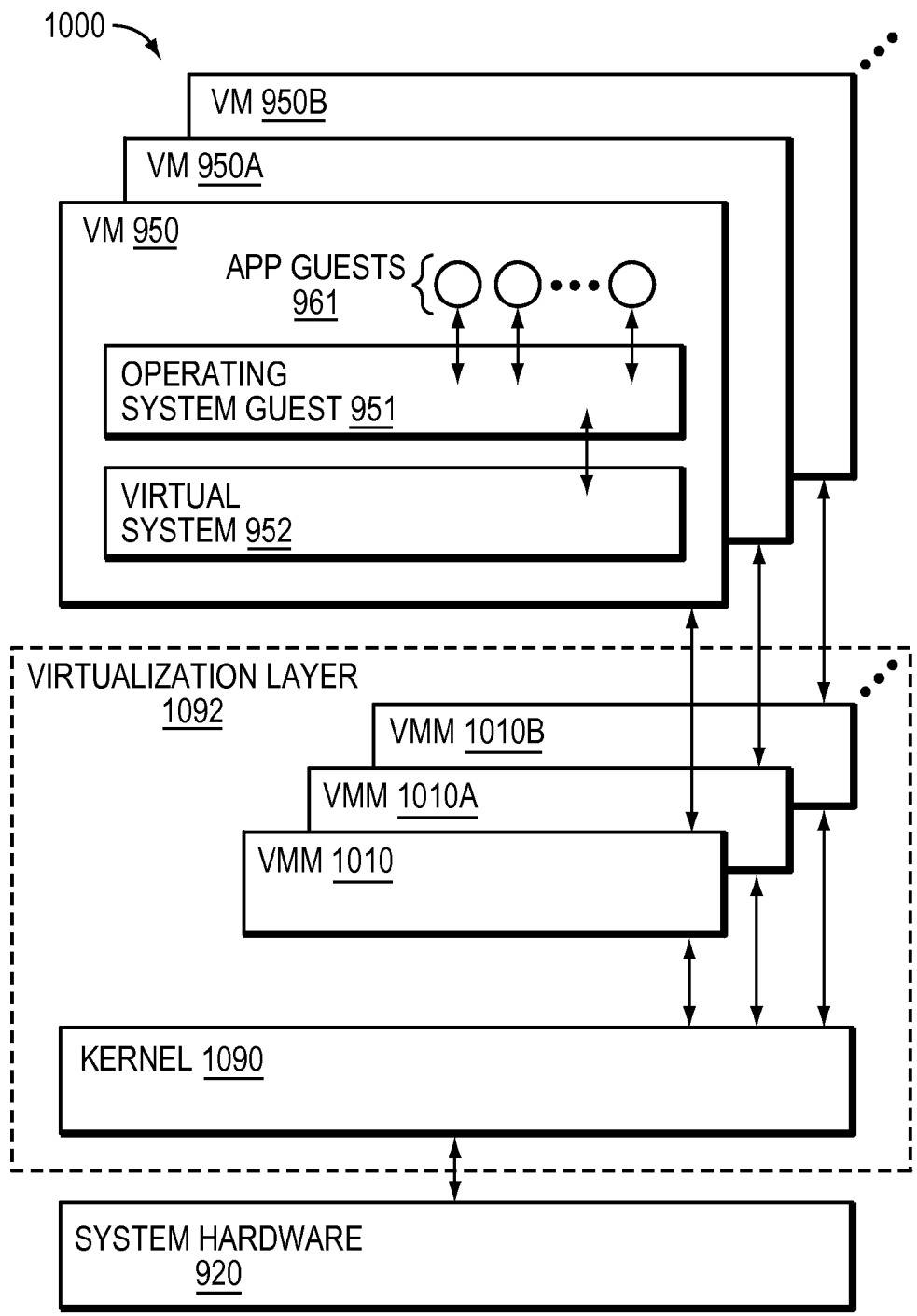

It is noted that while VMMs have been illustrated as executing on underlying system hardware, many implementations based on the basic abstraction may be implemented. In particular, some implementations of VMMs (and associated virtual machines) execute in coordination with a kernel that itself executes on underlying system hardware, while other implementations are hosted by an operating system executing on the underlying system hardware and VMMs (and associated virtual machines) executed in coordination with the host operating system. Such configurations, sometimes described as "hosted" and "non-hosted" configurations, are illustrated in FIGS. 4 and 5. However, the description herein refers to the physical system that hosts a virtual machine(s) and supporting components, whether in the "hosted" or "non-hosted" configuration, as a virtual machine host. To avoid confusion, the "hosted" configuration will be referred to herein as "OS hosted" and the "non-hosted" configuration will be referred to as "non-OS hosted." In the "OS hosted" configuration, an existing, general-purpose operating system (OS) acts as a "host" operating system that is used to perform certain I/O operations. In the "non-OS hosted" configuration, a kernel customized to support virtual machines takes the place of the conventional operating system.

With respect to OS hosted virtual computers, FIG. 4 depicts an embodiment of a virtualization system configuration referred to as an "OS hosted" configuration. Virtualization system 900 includes virtual machines 950, 950A, and 950B and respective virtual machine monitors VMM 910, VMM 910A, and VMM 910B. Virtualization system 900 also includes virtualization layer 990, which includes VMMs 910, 910A, and 910B. VMMs 910, 910A, and 910B are co-resident at system level with host operating system 920 such that VMMs 910, 910A, and 910B and host operating system 920 can independently modify the state of the host processor. VMMs call into the host operating system via driver 921 and a dedicated one of user-level applications 930 to have host OS 920 perform certain I/O operations on behalf of a corresponding VM. Virtual machines 950, 950A, and 950B in this configuration are thus hosted in that they run in coordination with host operating system 920. Virtual machine 950 is depicted as including application guests 961, operating system guest 951, and virtual system 952. Virtualization systems that include suitable facilities are available in the marketplace. For example, VMware® Server virtual infrastructure software available from VMware, Inc., Palo Alto, Calif. implements an OS hosted virtualization system configuration consistent with the illustration of FIG. 4; and VMware® Workstation desktop virtualization software, also available from VMware, Inc. also implements a hosted virtualization system configuration consistent with the illustration of FIG. 4.

With respect to non-OS hosted virtual computers, FIG. 5 depicts an embodiment of a virtualization system configuration referred to as a "non-OS hosted" virtual machine configuration. In FIG. 5, virtualization system 1000 includes virtual machines 950, 950A, and 950B as in FIG. 4. In contrast to FIG. 4, virtualization layer 1092 of FIG. 5 includes VMMs 1010, 1010A, and 1010B, and dedicated kernel 1090. Dedicated kernel 1090 takes the place, and performs the conventional functions, of a host operating system. Virtual computers (e.g., VM/VMM pairs) run on kernel 1090. Virtualization systems that include suitable kernels are available in the marketplace. For example, ESX Server™ virtual infrastructure software available from VMware, Inc., Palo Alto, Calif. implements a non-hosted virtualization system configuration consistent with the illustration of FIG. 5.

Different systems may implement virtualization to different degrees—"virtualization" generally relates to a spectrum of definitions rather than to a bright line, and often reflects a design choice in respect to a trade-off between speed and efficiency and isolation and universality. For example, "full virtualization" is sometimes used to denote a system in which no software components of any form are included in the guest other than those that would be found in a non-virtualized computer; thus, the OS guest could be an off-the-shelf, commercially available OS with no components included specifically to support use in a virtualized environment.

With respect to para-virtualization, as the term implies, a "para-virtualized" system is not "fully" virtualized, but rather a guest is configured in some way to provide certain features that facilitate virtualization. For example, the guest in some para-virtualized systems is designed to avoid hard-to-virtualize operations and configurations, such as by avoiding certain privileged instructions, certain memory address ranges, etc. As another example, many para-virtualized systems include an interface within the guest that enables explicit calls to other components of the virtualization software. For some, the term para-virtualization implies that the OS guest (in particular, its kernel) is specifically designed to support such an interface. According to this definition, having, for example, an off-the-shelf version of Microsoft Windows XP as the OS guest would not be consistent with the notion of para-virtualization. Others define the term para-virtualization more broadly to include any OS guest with any code that is specifically intended to provide information directly to the other virtualization software. According to this definition, loading a module such as a driver designed to communicate with other virtualization components renders the system para-virtualized, even if the OS guest as such is an off-the-shelf, commercially available OS not specifically designed to support a virtualized computer system.

Unless otherwise indicated or apparent, virtualized systems herein are not restricted to use in systems with any particular "degree" of virtualization and are not to be limited to any particular notion of full or partial ("para-") virtualization.

In the preferred embodiment, VMware virtual processing includes the VMware ESX Server technology and provides a VMM and a VM that has at least one virtual processor and is operatively connected to the VMM for running a sequence of VM instructions, which are either directly executable or non-directly executable. VMware technology, including the ESX server, is described in U.S. Pat. No. 6,397,242 to Devine et. al, issued May 28, 2002, which is hereby incorporated in its entirety by this reference.

Figure 6:
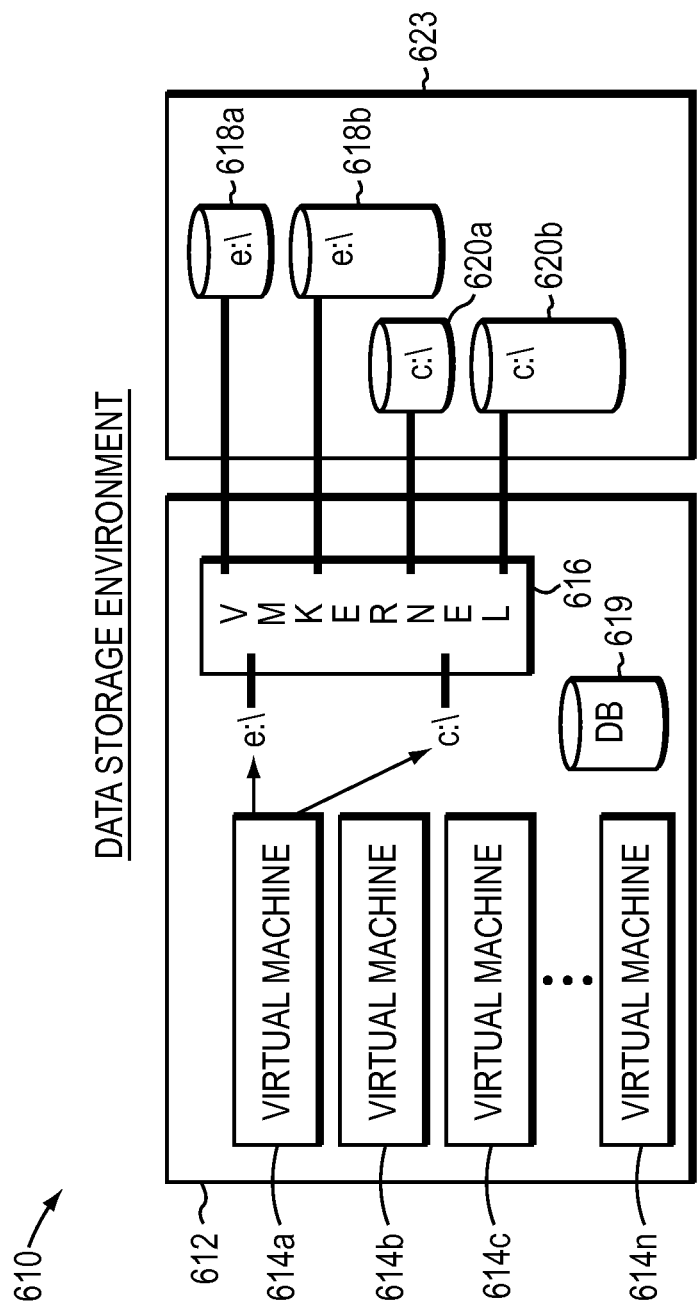

In a preferred embodiment, referring to FIG. 6, a Data Storage Environment 610 is shown including a VMware ESX Server 612 having a series of Virtual Machines 614a-n, a database 619 and VM Kernel 616. Server 612 engages on Data Storage System 623 logical units 618a-b and 620a-b, designated with virtual drive designations e:\ and c:\, respectively.

The VMware ESX Server is configured to boot Virtual Machines (VMs) from external storage. In the example case of a preferred embodiment shown in FIG. 6, a Data Storage System 623 (e.g., EMC CLARiiON) contains both the boot volume (c:\) and another volume (e:\) for a preferred Windows 2000 VM. Any VMware-supported Guest operating system would work in view of the teachings herein. Currently, such Guest operating systems include most of the popular x86 operating systems, including Windows and Linux. Similarly, additional drives could be added, up to half the supported number of Logical Unit Numbers (LUNs) on an ESX Server.

Figure 7:
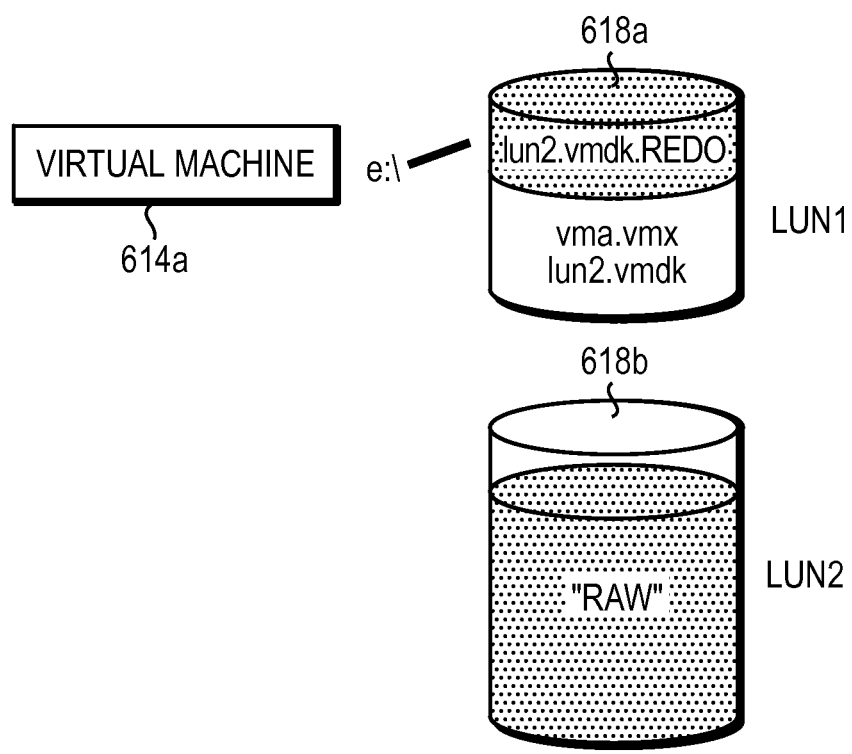

Regarding FIG. 7, taking a closer look at one of the volume pairs that has been discussed with reference to FIG. 6, it can be seen that logical volume 618a also known as LUN 1 has the VMware VM configuration (.vmx) file. It also has the two other files that comprise the e:\ drive for Virtual Machine 614a. First, LUN 1 has a pointer—called lun2.vmdk—to the "raw disk" at logical volume 18a also known as LUN 2, where most of the data resides. Second, there is a standard VMware ESX Server ".REDO log" on LUN 1. This .REDO log contains tracks that have been changed since the last time a .REDO log had been written out, or flushed, to LUN 2. This uses the preferred VMware VMFS "raw disk mapping" (RDM) functionality. The VMkernel 616 of FIG. 6 presents one e:\ drive to the Virtual Machine 614a from a combination of data it finds on the two LUNs 618a and 618b.

In at least one embodiment of the current technique, when a virtual client machine is configured in data storage environment 610, a virtual server configured to monitor virtual client machines detects the newly configured virtual client machine, generates a unique identifier for the virtual client machine and adds the unique identifier in a VMware VM configuration (.vmx) file associated with the virtual client machine.

Figure 8:
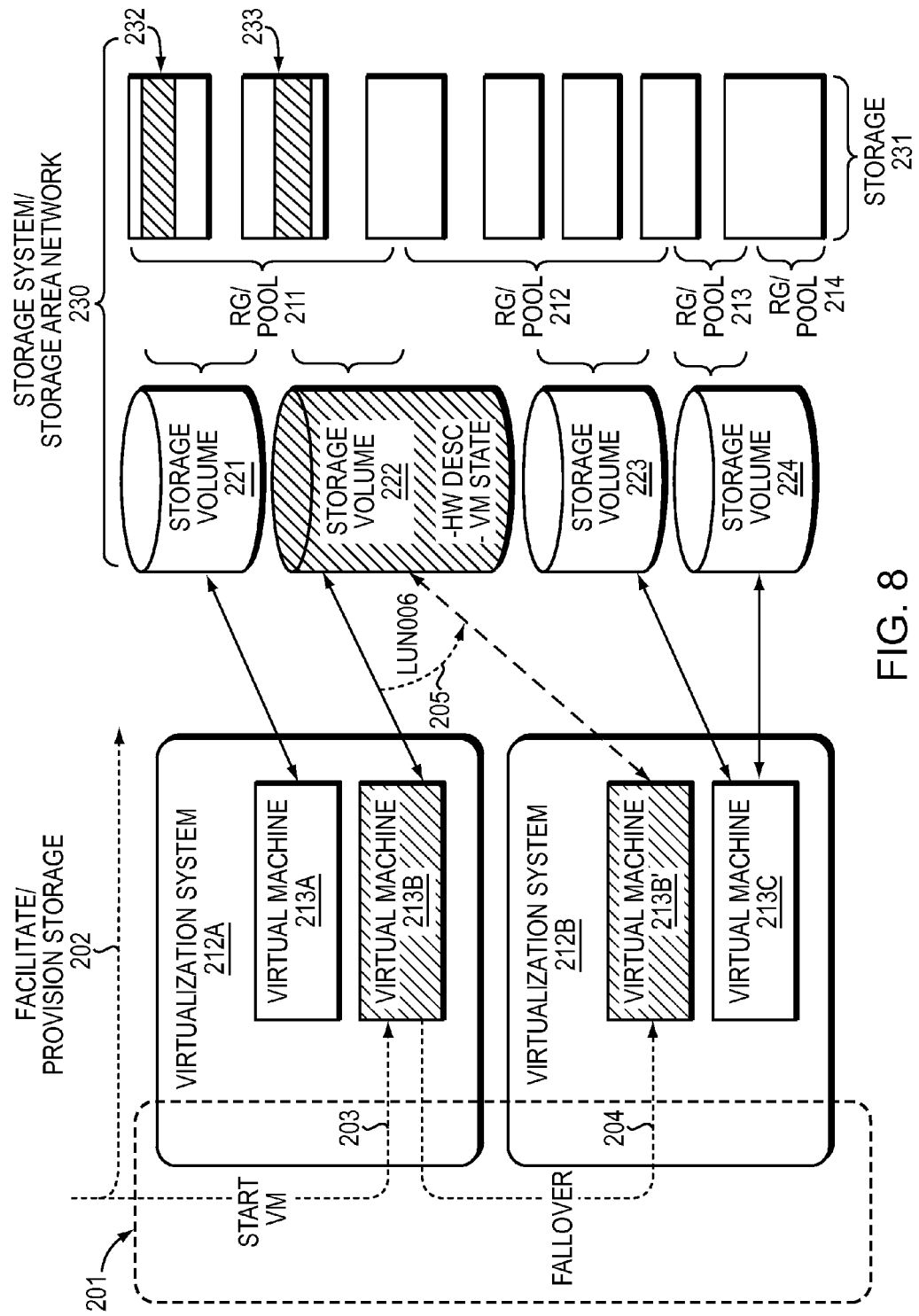

FIG. 8 illustrates an embodiment in which a coordination and provisioning system 201 (such as VMware® vCenter™ Server) is employed to facilitate provisioning of storage (202), e.g., LUNs, derived from underlying storage media 231 (and RAID groups (RGs) or pools 211, 212, 213 and 215) of storage system or storage area network (SAN) 230 and to provision, control and coordinate (see 203) execution of virtual machine instances (e.g., VMs 213A, 213B, 213C and 213D) on respective virtualization systems 212A and 212B.

Thus, for example, portions 232 and 233 of storage 231 may be provisioned from RAID group or pool 211 as storage volume 222 (LUN006) which may encode an encapsulation of an exposed virtual disk(s) and virtual machine state. System 201 may be used to handle a failover situation (204) for the virtual machine instances so that, for example, virtual machine instance 213B' can take over for a failed virtual machine instance 213B using LUN006. In general, a virtual server such as VMware® vCenter™ Server manages virtual machines (also referred to herein as "virtual client machine"). A virtual machine is associated with a unique identifier and information about its virtual devices, including virtual disks. Further, for example, vCenter™ Server as described above is part of a virtualized environment deployed using VMware® vSphere™.

In general, vCenter™ Server (also referred to herein as "virtual center") manages virtual machines, and each virtual machine has a unique identifier and information about its virtual devices, including virtual disks. (It is to be understood that VMware® vCenter™ is only an example of a "virtual center", which may be any component managing VMs across the physical infrastructure. Examples of other products having such components include Microsoft® Virtual Server 2005 and virtualization products from XenSource, Inc.)

Figure 9:
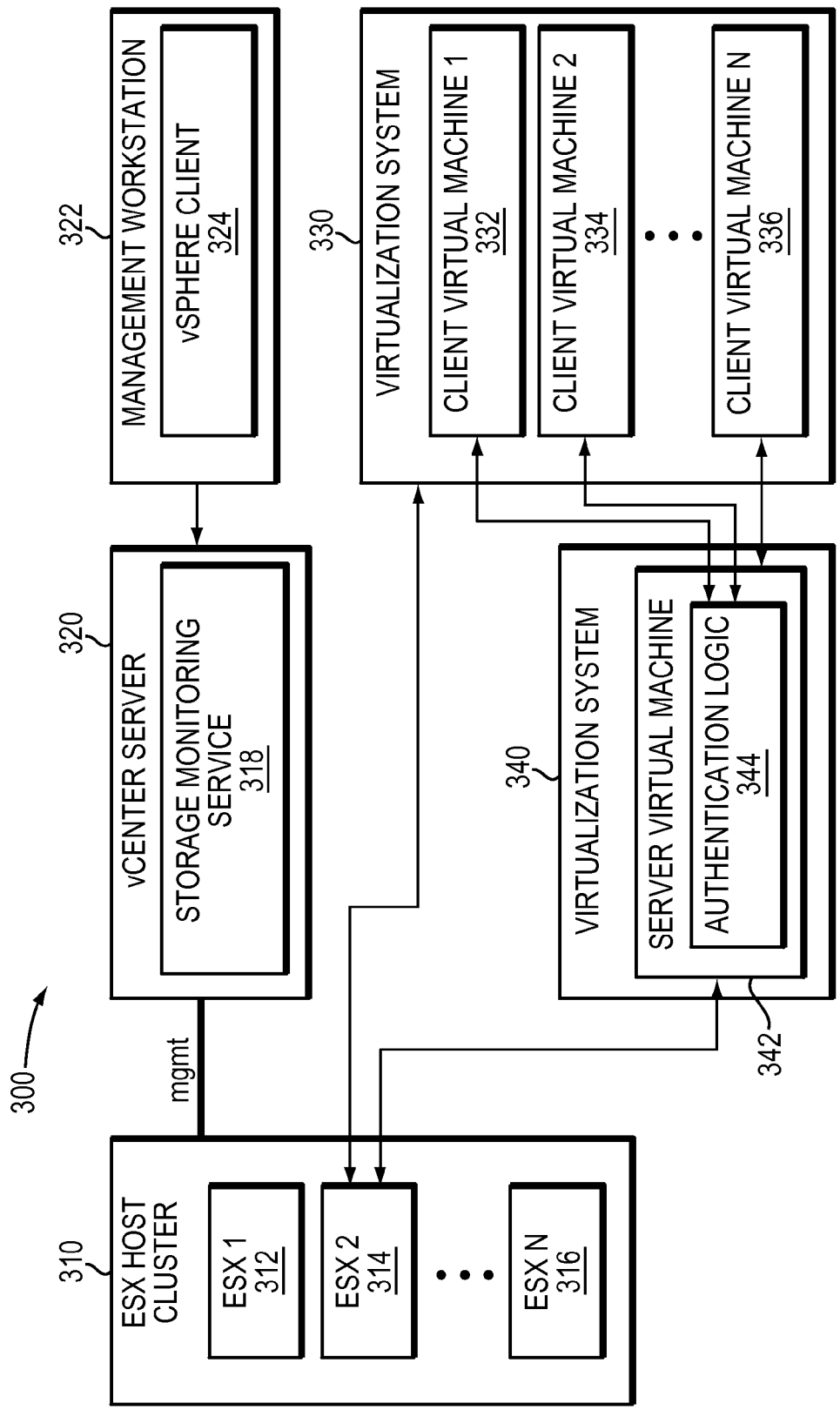

Referring to FIG. 9, shown is detailed representation of a collection of computational systems in which an embodiment of the current technique may be provided. VMware® vSphere™ provides management services such as VMware® vCenter™ Agent that allows vSphere™ hosts 310 to connect to vCenter™ Server 320 for centralized management of the hosts and virtual machines. Further, VMware® vCenter™ Server is a centralized management tool for the VMware® vSphere™. VMware® vCenter™ Server 320 enables management of one or more ESX servers 312, 314, 316, and Virtual Machines (VMs) included in each ESX server using a single console application. VMware® vCenter™ Server 320 provides storage administrators insight into the status and configuration of clusters, hosts, VMs, storage, operating systems, and other critical components of a virtual infrastructure from a single place (e.g., console application). Further, VMware® vCenter™ Server 320 may be installed on a physical or virtual machine. In a virtualized environment such as VMware® vSphere™ environment, a vCenter™ Server instance manages a set of ESX servers and storage resources associated with the set of ESX servers. Storage devices of a data storage system are used and managed by a vCenter™ Server instance.

Further, a user of a VMware® vSphere™ client 324 may access inventory and configuration information from one or more vCenter™ Servers. A user of vSphere™ client 324 may view storage information using an instance of a virtual server (e.g., vCenter™ Server instance) if the user possess valid permissions for accessing the virtual server. A single instance of vCenter™ Server provides capability to manage hundreds of hosts, and thousands of virtual machines. Further, one or more vCenter™ Servers may be linked together to provide capability to manage thousands of hosts and tens of thousands of virtual machines using one or more vCenter™ Server instances via a single management console (e.g. VMware® vSphere™ client 322).

Virtual center 320, virtualization systems 330, 340, and ESX hosts 312, 314, 316 are connected on a network which may be, include, or be included in the Internet, an intranet, network, or other wireless or other hardwired connection. Each of the virtual client machines 332, 334, 336 is a virtual machine having a VM identifier that is stored in a configuration file associated with the virtual machine that runs in virtualization system 330. Server virtual machine 342 includes authentication logic 344 that helps authenticate virtual client machines 332, 334, 336. For attempting to gain access to resources of ESX 314, each of the virtual client machine 332, 334, 336 requests respective configuration file, retrieves respective identifier, and submits the respective identifier to virtual server machine 342 for authentication.

Further, in at least one embodiment of the current technique, authentication logic 344 retrieves an identifier from ESX 314 based on information (such as IP address) derived from a connection (such as network TCP connection) established by a virtual client machine, and authenticates the virtual client machine by comparing the identifier retrieved from ESX 314 with a VM identifier provided by the virtual client machine. If the identifier matches with the VM identifier, the virtual client machine is authenticated successfully. However, if the identifier does not match with the VM identifier, the virtual client machine fails to be authenticated. Depending on the implementation, the derivation of an identifier by authentication logic 344 may include or take into account one or more other factors in addition to the identifier.

Thus, virtual client machines 332, 334, 336 submits information such as an identifier to virtual server machine 344 such that authentication logic 344 uses the information provided by the virtual client machines and VMware® ESX Server™ 314 to help determine whether to allow virtual client machines 332, 334, 336 access storage resources managed by VMware® ESX Server™ 314. In such an example, based on the information which can be used to identify virtual client machines 332, 334, 336, authentication logic 344 can communicate with ESX 314 and/or virtual center 320 to determine whether virtual client machines 332, 334, 336 are running in virtualization system 330. Further, authentication logic 344 determines whether to allow virtual client machines 332, 334, 336 to access resources of virtualization system 330. Further, vCenter™ Server 320 includes a status component 318 that displays the health of components of the vCenter™ Server 320 thereby enabling storage administrators to quickly identify and correct failures that may occur in vCenter™ management infrastructure 300.

The method of authenticating a virtual client is described using general language below herein. Most generally, a first machine (such as a virtual server machine) authenticates an untrusted second machine (such as a virtual client machine) as a condition to allowing or performing a protected operation for the second machine. The machines may be physical machines or virtual machines. The protected operation may be almost any operation to which some type of access control is applied. For example, it may be access to a private database, or generating a security credential for use by a virtual client.

In at least one embodiment of the current technique, the first machine performs a first operation that monitors a virtual client machine, identifies a configuration file associated with the virtual client machine and includes an authentication identifier to be stored in the configuration file. The authentication identifier is a data item that is uniquely associated with the authentication of the second machine by the first machine. For example, it may be (or contain) a pseudorandom value generated by the first machine for this specific use. It is preferable that the authentication identifier have sufficient entropy so as to not be easily guessable by an intruder or other person not permitted access to the protected operation.

"Trusted" in this context means that only trusted components, communications and other mechanisms involved in the write operation are all explicitly or implicitly trusted by the first computer, whereas "untrusted" means that at least part of the write operation includes at least one element that is not trusted, namely the untrusted second computer.

Further, the first machine performs a second operation identifying the configuration file. The second operation is performed using a read mechanism by which the configuration file can be read from. The first machine is looking for an expected result that can generally only be obtained when the second machine is in fact authentic, because receiving the expected result indicates that the second machine has a configuration file known to and under the control of the trusted management server. Then, the first machine performs or allows the protected operation only upon successfully obtaining a copy of the authentication identifier in the second operation (which has been retrieved from the configuration file that was written to in the first operation).

Thus, the method of authentication is based on using a trusted mechanism to test whether an untrusted second machine is in fact trustworthy. Generally "mechanism" refers to some combination of local file accesses and communication exchanges over one or more of connections. The trusted mechanism reliably returns either the contents of a configuration file or an indication that no such file exists. If the second machine is authentic, the configuration file exists and include the correct authentication identifier written to it before the read access so that the correct value is returned in response to the read.

However, it is assumed that a second machine (e.g., a virtual client) has initially provided an IP address or other value to a first machine (e.g., a virtual server) indicating that the second machine is a legitimate member of a virtualization environment. For example, a network address appears as one that is or could have been actually configured in the network, based on IP prefix or other indicia for example. The second machine then uses the authentication method described in FIG. 11 below to confirm, using information such as an identifier and IP address, that this is indeed the case.

In such a virtualization environment, the first operation described above herein may be a command or request from a virtual server for writing an authentication identifier associated with a virtual client to a configuration file associated with the virtual client. The second operation described above herein may be a request from the virtual server to a management server (e.g., VMware® ESX Server™) to read the contents of the same configuration file. In such a case, the request identifies not only the configuration file, but also identifies a specific virtual client machine with which the virtual server believes it is communicating. For example, the request may include the IP address that the untrusted virtual client machine initially provided, as mentioned above. In response to this request, the management server accesses the contents of the identified configuration file, provides the value of the authentication identifier as stored in the configuration file (assuming it is found). Then, the virtual server compares the value retrieved by the management server with the authentication identifier provided by the virtual client. If these match, this is a successful authentication and the virtual server performs or allows the protected operation. Otherwise, authentication is not successful, and appropriate steps are taken (which will normally include not performing or allowing the protected operation, or doing so in a way that is more limited than in the case of successful authentication).

In the case of an inauthentic client, one of several conditions will usually be met that will prevent the above method from succeeding. In one case, a client identifier presented by the virtual client does not identify any client machine actually known to or under the control of the management server. For example, the proffered identifier may be a guess or a copy of an identifier from some other machine or system. In such a case, the management server returns an error indication to the virtual server indicating that either the client or file does not exist. The virtual server interprets this response as indicating that the virtual client is inauthentic.

It should be noted that the management server may utilize the same computer hardware as the virtual server or the virtual client, or it may run on separate computer hardware. In at least one embodiment, described below, the virtual server and virtual client are realized as virtual machines running on physical host machine(s), and the management server is a utility component in a virtual machine monitor or other privileged system software having a supervisory or control relationship with the virtual client machine. For example, the management server may be part of a privileged control virtual machine used for support and control of one or more client virtual machines executing on the same host physical machine (or collection of host physical machines).

It should be noted that as but one example, the virtual server may be a credential server providing security credentials used for accessing services in a network. Thus, the virtual server and the virtual client engage in an authentication procedure by which the virtual server "authenticates" the virtual client, i.e., determines from certain information and/or behavior whether the virtual client is actually what it purports to be. In at least one embodiment, for example, virtual client machines are identified within a network by an Internet Protocol (IP) address, and during authentication the virtual client may present an IP address to the virtual server as proof that the client machine is a member of a given network and therefore entitled to obtain a credential for use within that network. The client-server exchange is conducted over a client-server connection. As described in more detail below, the virtual server may then engage the virtual client as well as the management server in a process of confirming the authenticity of the virtual client. In the parlance of computer security, the terms "trusted" and "untrusted" can be useful descriptors for the actors in such an authentication procedure. In the above example, the virtual server may deem the virtual client untrusted until successfully authenticated, whereas it deems the management server as a trusted peer on which it relies during the authentication process.

Figure 10:
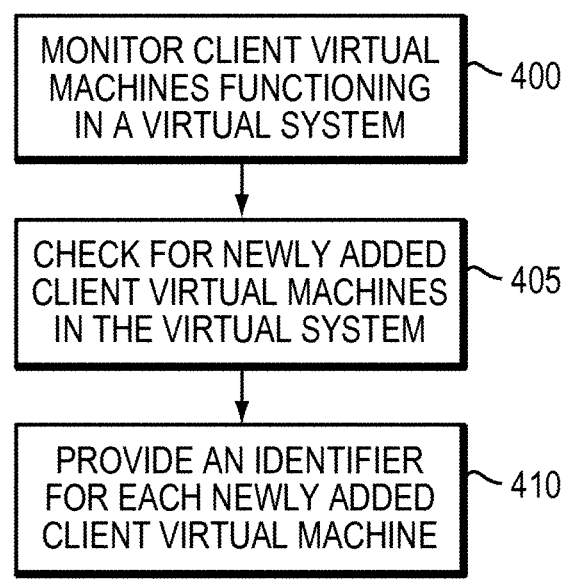
FIGS. 10-11 are flow diagrams illustrating processes that may be used in connection with techniques herein.

In at least one embodiment, the virtual server is known to the management server and is able to request execution of certain actions that may involve privileged operations with respect to the virtual client machine. The communication between the virtual server and management server is via a server-manager connection. In this context, "privileged" refers to the type of access Referring to FIG. 10, shown is a more detailed flow diagram illustrating managing authentication of virtual clients. With reference also to FIG. 9, a virtual server machine (e.g., virtual server machine 342) monitors a set of virtual client machines (e.g., client virtual machines 332, 334, 336) in a virtualization environment where the set of virtual client machines are managed by a management server (e.g., VMware® ESX Server™ 314) (step 400). When a virtual client is configured in the virtualization environment, the virtual server machine discovers the newly added virtual client machine (step 405). Consequently, the virtual server machine provides a unique identifier for the newly added virtual client machine which is added to a configuration file associated with the virtual client machine (step 410). The configuration file may be stored on the management server that manages the set of virtual client machines. However, it should be noted that the configuration file for a virtual client machine may be stored at any one of the systems included in the virtualization environment 300.

Figure 11:
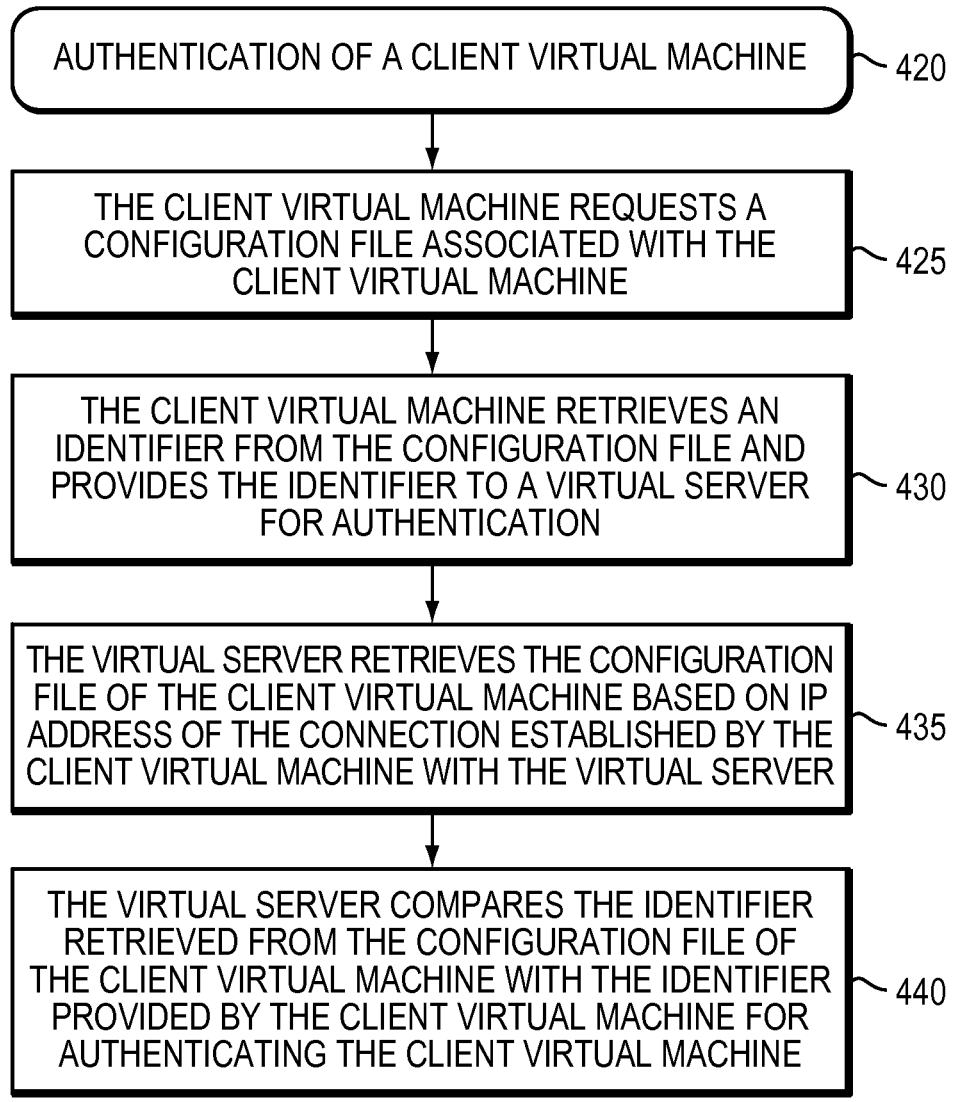

Referring to FIG. 11, shown is a more detailed flow diagram illustrating managing authentication of virtual clients. With reference also to FIG. 9, a virtual client machine is authenticated by a virtual server machine (step 420). The virtual client machine requests a configuration file associated with the virtual client machine from a management server managing the virtual client machine (step 425). The virtual client machine retrieves an identifier from the configuration file and provides the identifier to the virtual server for authentication (step 430). Generally, the identifier retrieved by the virtual client machine is same as the identifier assigned to the virtual client machine by the virtual server machine. The virtual client machine communicates with the virtual server machine for authentication of the virtual client machine. In order to authenticate the virtual client machine, the virtual server machine attempts to determine whether the virtual client machine is in fact the same virtual client machine that has been configured and assigned the unique identifier by the virtual server machine previously. The virtual client machine provides the identifier retrieved in step 430 above to the virtual server machine by establishing a connection with the virtual server machine. The virtual server machines requests a list of virtual client machines managed by the management server. Based on the IP address of the connection established by the virtual client machine, the virtual server machine determines whether the virtual client machine is part of the list of virtual client machines. Based on the determination, the virtual server machine requests a configuration file associated with the virtual client machine from the management server (step 435). The virtual server machine retrieves an identifier associated with the virtual client machine from the configuration file provided by the management server. Then, the virtual server machine compares the identifier retrieved from the configuration file provided by the management server with the identifier provided by the virtual client machine in order to authenticate the virtual client machine (step 440). If the identifier retrieved from the configuration file matches with the identifier provided by the virtual client machine, the virtual client machine is authenticated successfully. However, if the identifier retrieved from the configuration file does not match with the identifier provided by the virtual client machine, the virtual client machine fails authentication by the virtual server.

While the invention has been disclosed in connection with preferred embodiments shown and described in detail, their modifications and improvements thereon will become readily apparent to those skilled in the art. Accordingly, the spirit and scope of the present invention should be limited only by the following claims.

What is claimed is:

1. A method for use in managing authentication of virtual clients, the method comprising:

generating an identifier for a virtual client by a virtual server upon detecting the virtual client, wherein the identifier is added by the virtual server to a configuration file, wherein the configuration file is associated with the virtual client, wherein the configuration file associated with the virtual client is stored on a virtual management server which is separate from the virtual client, wherein the virtual management server manages a set of configuration files associated with a set of virtual clients; and based on the identifier, authenticating the virtual client by the virtual server, wherein authenticating the virtual client further comprising:

requesting a first configuration file associated with the virtual client from the virtual management server by the virtual client, providing a first identifier retrieved from the first configuration file received by the virtual client to the virtual server, requesting a second configuration file associated with the virtual client from the virtual management server by the virtual server upon receiving the first identifier from the virtual client, wherein the virtual server requests the second configuration file from the virtual management server based on information associated with a connection established by the virtual client with the virtual server, determining a second identifier from the second configuration file received by the virtual server, and comparing the first identifier received from the virtual client with the second identifier retrieved from the second configuration file associated with the virtual client, wherein the first and second configuration files are same as the configuration file associated with the virtual client and stored on the virtual management server.

2. The method of claim 1, further comprising:
requesting the configuration file from a virtual management server by the virtual client; and
providing the identifier to the virtual server for authentication, wherein the identifier is retrieved from the configuration file.

3. The method of claim 2, further comprising:
determining by the virtual server, an IP address of a connection established by the virtual client with the virtual server;
based on the IP address, requesting the configuration file associated with the virtual client from the virtual management server by the virtual server;
comparing the identifier provided by the virtual client with another identifier retrieved from the configuration file provided by the virtual management server; and
based on the comparison, authenticating the virtual client by the virtual server.

4. The method of claim 1, further comprising:
monitoring a set of virtual clients in a virtual system environment.

5. The method of claim 1, wherein the identifier reflects the instantiation of the virtual client across a virtual system environment.

6. The method of claim 4, wherein the virtual system environment includes an ESX server, a Virtual Center server, the virtual server, and a set of virtual clients.

7. The method of claim 1, wherein the identifier uniquely identifies the virtual client across a virtual system environment.

8. The method of claim 1, wherein the configuration file associated with the virtual client is stored in a virtual management server.

9. A system for use in managing authentication of virtual clients, the system comprising a processor configured to:
generate an identifier for a virtual client by a virtual server upon detecting the virtual client, wherein the identifier is added by the virtual server to a configuration file, wherein the configuration file is associated with the virtual client, wherein the configuration file associated with the virtual client is stored on a virtual management server which is separate from the virtual client, wherein the virtual management server manages a set of configuration files associated with a set of virtual clients; and based on the identifier, authenticate the virtual client by the virtual server, wherein authentication of the virtual client further comprising:

request a first configuration file associated with the virtual client from the virtual management server by the virtual client, provide a first identifier retrieved from the first configuration file received by the virtual client to the virtual server, request a second configuration file associated with the virtual client from the virtual management server by the virtual server upon receiving the first identifier from the virtual client, wherein the virtual server requests the second configuration file from the virtual management server based on information associated with a connection established by the virtual client with the virtual server, determine a second identifier from the second configuration file received by the virtual server, and compare the first identifier received from the virtual client with the second identifier retrieved from a the second configuration file associated with the virtual client, wherein the first and second configuration files are same as the configuration file associated with the virtual client and stored on the virtual management server.

10. The system of claim 9, further comprising:
request the configuration file from a virtual management server by the virtual client; and
provide the identifier to the virtual server for authentication, wherein the identifier is retrieved from the configuration file.

11. The system of claim 10, further comprising:
determine by the virtual server, an IP address of a connection established by the virtual client with the virtual server;
request, based on the IP address, the configuration file associated with the virtual client from the virtual management server by the virtual server;
compare the identifier provided by the virtual client with another identifier retrieved from the configuration file provided by the virtual management server; and
authenticate, based on the comparison, the virtual client by the virtual server.

12. The system of claim 9, further comprising:
monitor a set of virtual clients in a virtual system environment.

13. The system of claim 9, wherein the identifier reflects the instantiation of the virtual client across a virtual system environment.

14. The system of claim 13, wherein the virtual system environment includes an ESX server, a Virtual Center server, the virtual server, and a set of virtual clients.

15. The system of claim 9, wherein the identifier uniquely identifies the virtual client across a virtual system environment.

16. The system of claim 9, wherein the configuration file associated with the virtual client is stored in a virtual management server.

* * * * *